United States Patent
Arlitt et al.

(10) Patent No.: US 11,463,331 B1
(45) Date of Patent: Oct. 4, 2022

(54) IDENTIFICATION OF BEACONING FROM NETWORK COMMUNICATION EVENTS OF NETWORK TRAFFIC LOG

(71) Applicant: MICRO FOCUS LLC, Santa Clara, CA (US)

(72) Inventors: Martin Arlitt, Calgary (CA); Mijung Kim, Santa Clara, CA (US); Manish Marwah, Santa Clara, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 17/332,289

(22) Filed: May 27, 2021

(51) Int. Cl.
*G06F 15/173* (2006.01)
*H04L 43/028* (2022.01)
*H04L 43/0817* (2022.01)
*H04L 43/067* (2022.01)
*H04L 43/106* (2022.01)

(52) U.S. Cl.
CPC .......... *H04L 43/028* (2013.01); *H04L 43/067* (2013.01); *H04L 43/0817* (2013.01); *H04L 43/106* (2013.01)

(58) Field of Classification Search
None
See application file for complete search history.

(56) References Cited

U.S. PATENT DOCUMENTS

| | | | |
|---|---|---|---|
| 8,578,493 B1 * | 11/2013 | Cowan | G06F 21/554 709/224 |
| 10,264,007 B2 | 4/2019 | Fehrman | |
| 10,671,708 B2 | 6/2020 | Reed et al. | |
| 2010/0023867 A1 * | 1/2010 | Coldiron | H04L 41/22 715/736 |
| 2018/0083985 A1 | 3/2018 | Ahuja et al. | |
| 2020/0228924 A1 * | 7/2020 | Lelkens | G01S 5/0278 |
| 2020/0304529 A1 * | 9/2020 | Fehrman | H04L 63/0823 |
| 2021/0194907 A1 * | 6/2021 | Bertiger | H04L 41/142 |
| 2021/0320945 A1 * | 10/2021 | Black | H04L 63/1416 |

OTHER PUBLICATIONS

Kim, Seong Soo, "Real-Time Analysis of Aggregate Network Traffic for Anomaly Detection", May 2005, <http://cesg.tamu.edu/wp-content/uploads/2012/02/TAMU-ECE-2005-02.pdf>.

(Continued)

*Primary Examiner* — Anh Nguyen (57) ABSTRACT

Network communication events are filtered to remove the network communication events having a predicted unrelatedness to beaconing. Each network communication event has a timestamp, a source entity, and a destination entity. The filtered network communication events are aggregated by unique source entity-destination entity pairs. For each unique source entity-destination entity pair, the network communication events are timestamp-sorted, time differentials between the timestamps of adjacent network communication events are calculated, and a beacon likelihood metric is calculated from the calculated time differentials. Which of the unique source entity-destination entity pairs are indicative of beaconing are identified based on the beacon likelihood metric calculated for each unique source entity-destination entity pair.

20 Claims, 10 Drawing Sheets

(56) References Cited

OTHER PUBLICATIONS

Wheelus et al., "A Session Based Approach For Aggregating Network Tiafflc Data—The SANTA Dataset" 2014. <https://www.researchgate.net/publication/283018805_A_Session_Based_Approach_for_Aggregating_Network_Traffic_Data--_The_SANTA_Dataset >.
Ramos Regis Barbosa et al., "Toward Periodicity Based Anomaly Detection in SCADA Networks", Design and Analysis of Communications Systems (DACS) University of Twente Enschede, The Netherlands, 2012 https://ieeexplore.ieee.org/document/6489745.

\* cited by examiner

IDENTIFICATION OF BEACONING FROM NETWORK COMMUNICATION EVENTS OF NETWORK TRAFFIC LOG

BACKGROUND

A significant if not the vast majority of computing devices are globally connected to one another via the Internet. While such interconnectedness has resulted in services and functionality almost unimaginable in the pre-Internet world, not all the effects of the Internet have been positive. A downside, for instance, to permitting a computing device to reach nearly any other device around the world is the computing device's susceptibility to unwittingly communicate with malicious devices in ways unimaginable decades ago.

DETAILED DESCRIPTION

As noted in the background, a large percentage of the world's computing devices can communicate with one another over the Internet, which while generally advantageous renders the computing devices susceptible to unwittingly communicating with malicious devices. For instance, a client computing device, such as a desktop, laptop, or notebook computer, or a smartphone or tablet computing device, may become infected with malware associated with a nefarious party. As a result of such infection, the client device may periodically attempt to contact a server computing device that is also associated with the nefarious party. Such periodic communication is referred to as beaconing.

As a result of such periodic communication from a client computing device the server computing device can learn that the client device has successfully been infected with malware, and the server device may subsequently be able to control the client device for nefarious purposes. For example, the server device may be able to access confidential information stored on the client device, or probe other client devices on the same or other networks for vulnerabilities to access their stored confidential information. As another example, the server device may instruct the client device to participate in a destructive activity, such as a distributed denial of service (DDOS) attack, against a different server computing device. The nefarious party may wait a long length of time upon its server device first receiving beacons from a compromised client device before leveraging the client device in these ways, so as not to raise suspicion that the client device has been compromised. Similarly, the beacons themselves may be hours or days apart so as not to raise suspicion of client device compromise.

Techniques described provide for beaconing identification. Network communication events of a network traffic log can be filtered to remove events that are likely unrelated to beaconing. Each event has a timestamp indicative of when the event occurred, and the source entity and/or destination entity of the event, among other information. The filtered events can be aggregated by unique source entity-destination entity pairs. Network communication event filtering and aggregation can be iteratively performed as desired.

Once the network communication events have been satisfactorily filtered and aggregated, the events for each unique source entity-destination entity pair are timestamp-sorted, and time differentials between adjacent events are calculated. A beacon likelihood metric can then be calculated for each unique pair from its calculated time differentials. Unique source entity-destination entity pairs that are indicative of beaconing are identified based on the calculated beacon likelihood metrics. Remedial actions may then be performed to resolve the potential compromises in security that may be associated with such beaconing.

The beaconing identification performed in accordance with the techniques described herein cannot be practically performed manually or performed mentally in one's mind, even when such identification occurs in an offline manner, let alone in an online manner. The number of and amount of data within the network communication events are substantially voluminous for even a relatively small network (i.e., a network having a relatively small number of devices), and can exponentially increase with larger networks such as a typical enterprise network. There is no practical way such amounts of information can be analyzed in accordance with the techniques described herein using just paper and pencil, for instance. It would take months if not longer to manually perform the techniques on an even limited set of data representing a small timeframe of network communication, rendering them ineffective to actually identify beaconing in such a way that the information could be actionably used.

Figure 1A:
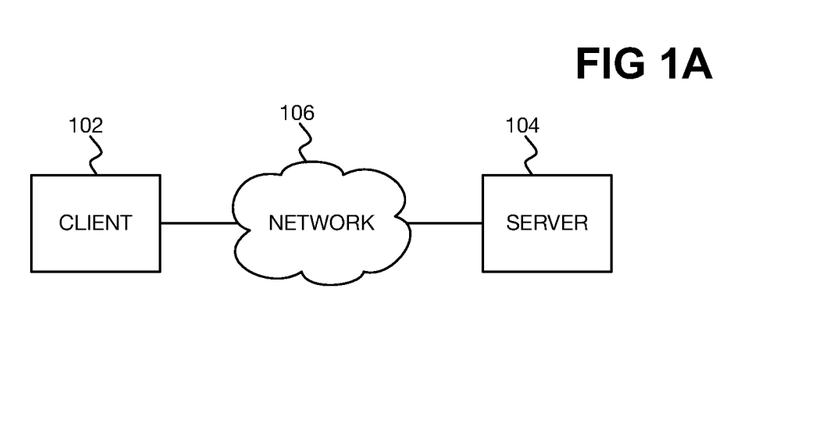
FIGS. 1A and 1B are diagrams depicting example beaconing between a client computing device and a server computing device.
Figure 1B:
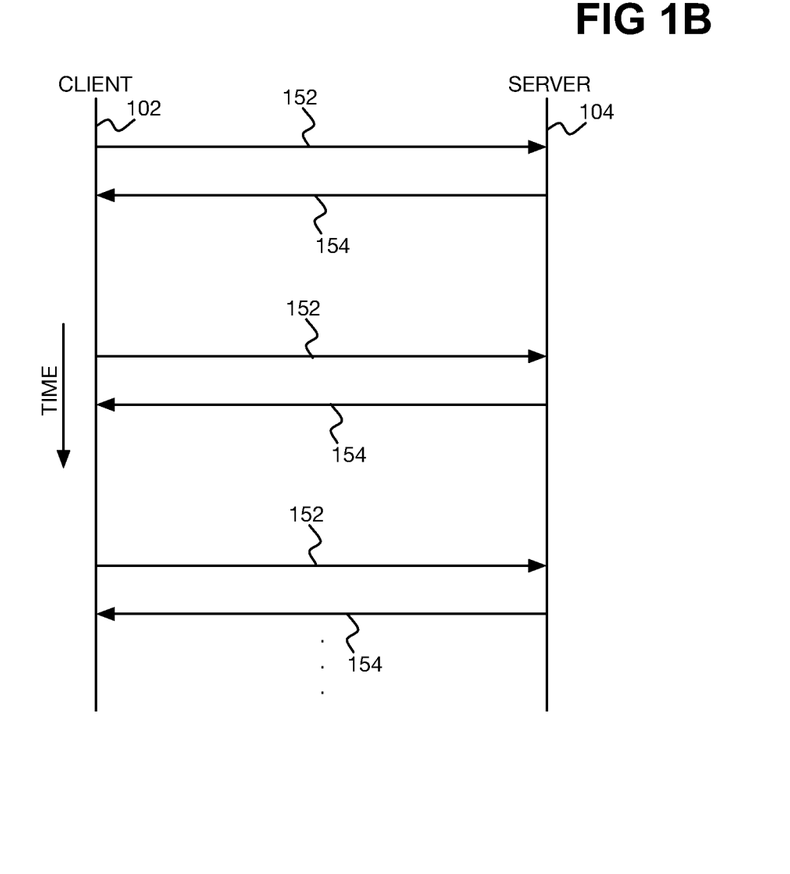

FIGS. 1A and 1B depict example beaconing between a client computing device 102 and a server computing device 104, which per FIG. 1A are communicatively connected with one another over a network 106. The client device 102 may be a desktop, laptop, or notebook computer, or another type of computing or other network-connected device, and may also be a server. The client device 102 may be one of a number of such client devices 102 of an enterprise or other organization. The server computing device 104 can be associated with a nefarious party. The network 106 may be or include the Internet, an extranet, an intranet, a local-area network, a wide-area network, a mobile communication network, a telephone network, a wireless network, a wired network, and so on. It is noted in this respect that the network 106 can be limited to a local-area or other network that is not connected to the Internet, such that beaconing activity can be detected even on such a network 106.

Per FIG. 1B, the client computing device 102 periodically sends outgoing communication 152 to the server computing device 104 on a regular basis over time. Such communication 152 can be considered a beacon, such that the periodic transmission of the communication 152 on a regular basis over time can be considered beaconing. The server device 104 in the example may respond to each communication 152 with communication 154 back to the client device 102, indicating that the server device 104 has received the beacon. However, in some situations the server device 104 may not respond to the beaconing. For example, the server device 104 may not want to call attention to the beaconing by replying, or the device 104 may no longer be online or otherwise operational.

Figure 2A:
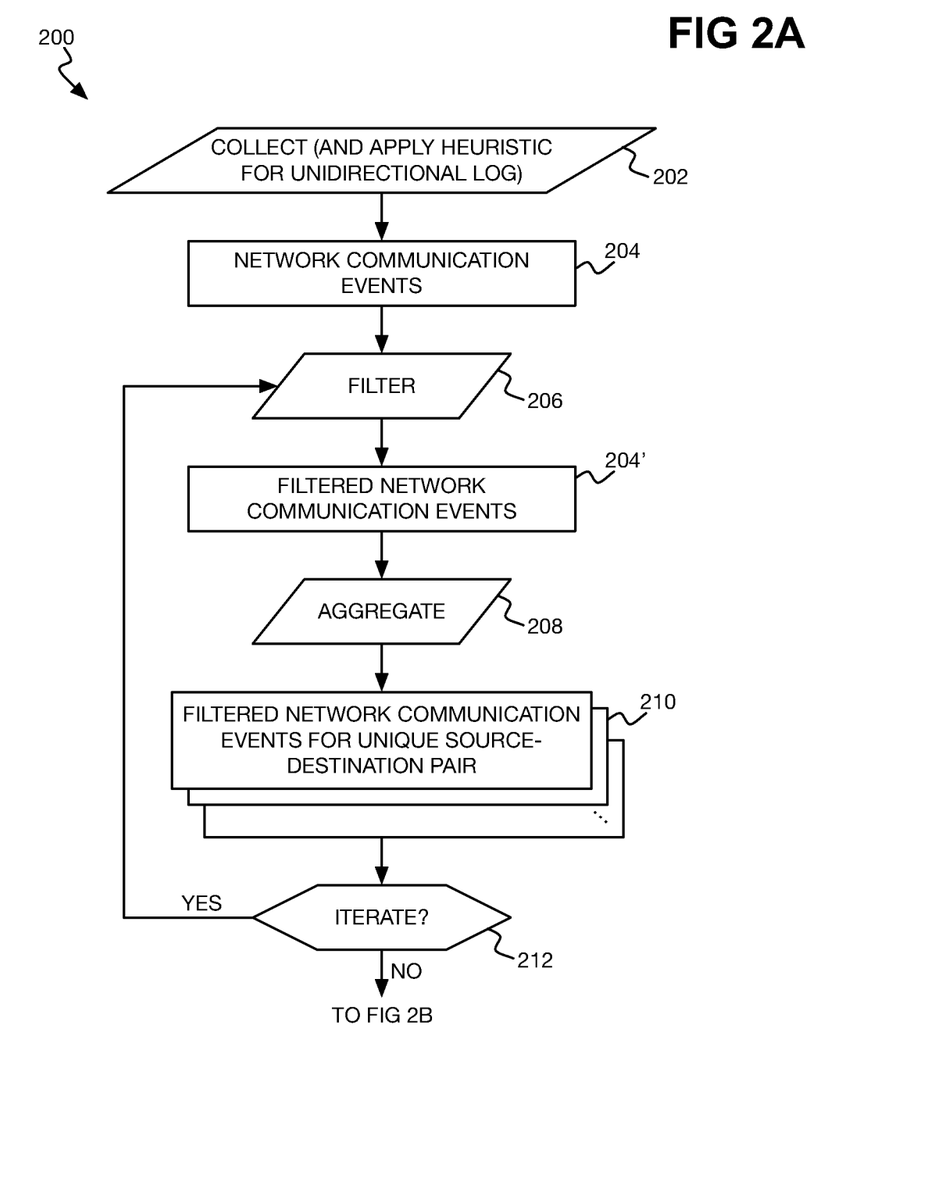
FIGS. 2A and 2B are diagrams of an example process for identifying beaconing.
Figure 2B:
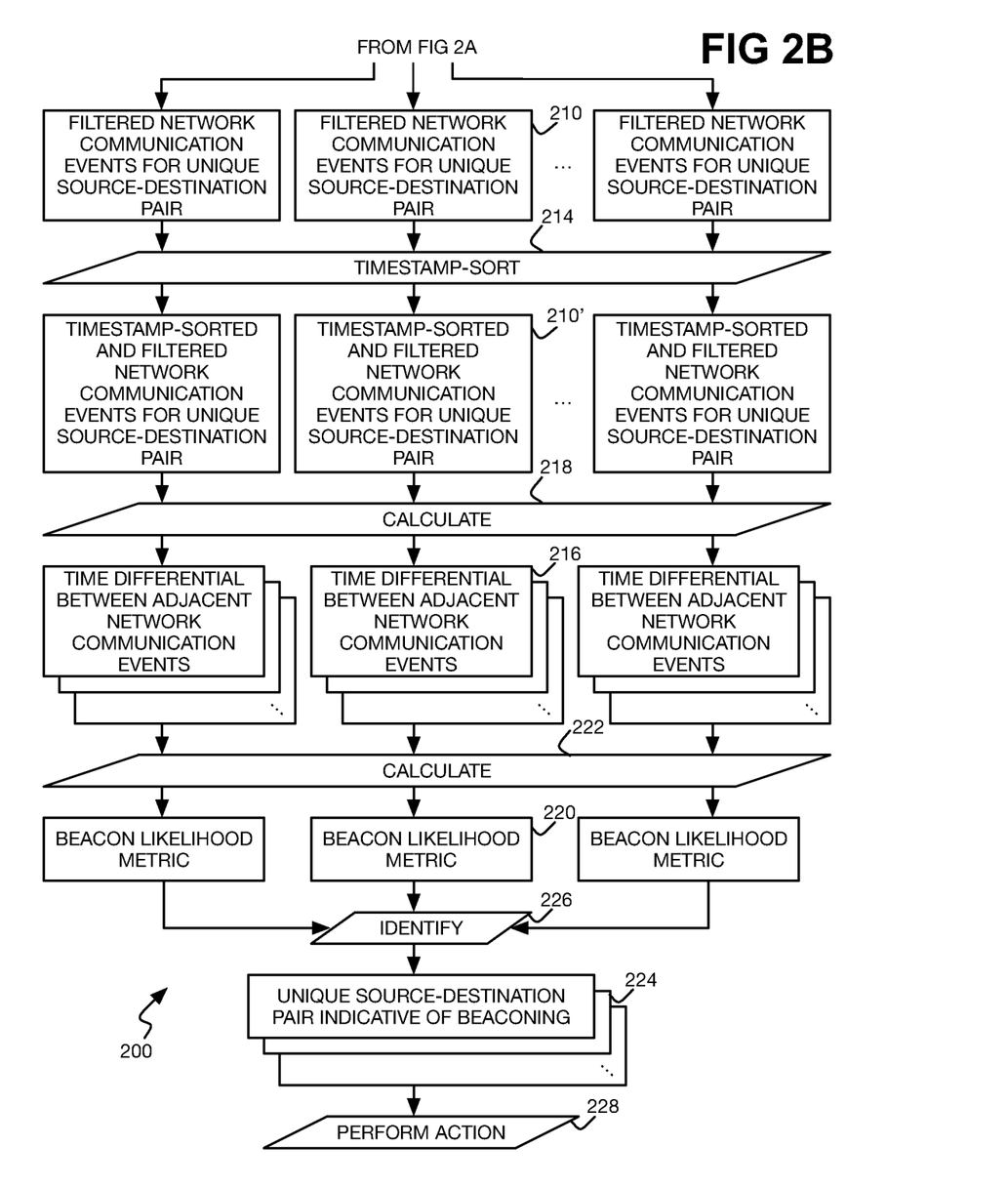

FIGS. 2A and 2B show an example process 200 for identifying beaconing. The process 200 may be implemented as program code stored on a non-transitory computer-readable data storage medium and executable by a processor of a computing device. The process 200 may be performed in an offline or an online manner. As to the offline manner, the process 200 may be performed on the basis of historical network communication that has been logged, to identify if beaconing occurred during the time encompassed by the logged communication. By comparison, online beaconing identification may be performed as network communication is logged, so that beaconing can be identified in a more realtime manner. A specific example of online beaconing identification is described later in the detailed description.

Figure 3A:
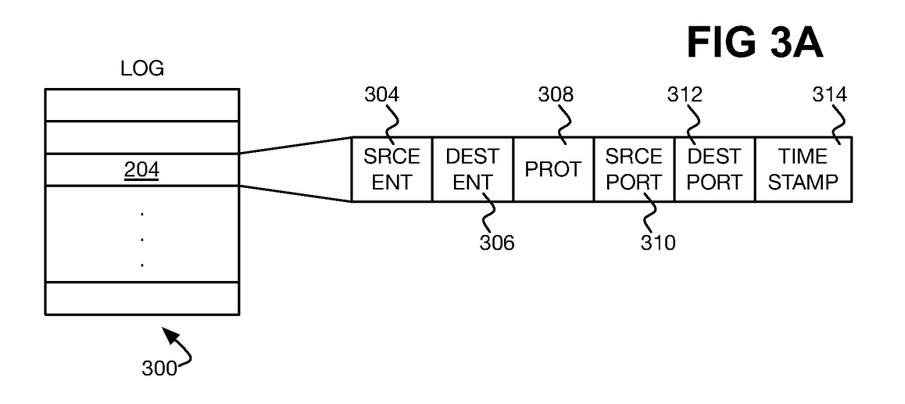
FIGS. 3A, 3B, and 3C are diagrams of example network traffic logs.

Referring first to FIG. 2A, network communication events 204 of one or multiple network traffic logs are collected (202). As shown in FIG. 3A, a network traffic log 300 can include multiple network communication events 204. Each network communication event 204 logs a network communication from a source entity 304 to a destination entity 306 that occurred at a time indicated by a timestamp 314 of the event 204. The source and the destination entities 304 and 306 may each be identified by network addresses, such as Internet protocol (IP) network addresses (e.g., IP version 4 or IP version 6 addresses), or in another manner.

Each network communication event 204 may further include the protocol 308 in accordance with which the network communication was sent from the source entity 304 to the destination entity 306. The protocol 308 can be a network transport protocol, such as the transmission control protocol (TCP) and the user datagram protocol (UDP), which are both built on top of the Internet protocol. Each event 204 may also include the source network port 310 from which the network communication was sent at the source entity 304, and the destination network port 312 to which the communication was sent at the destination entity 306. From the network transport protocol 308 and the destination network port 312 in particular, another protocol 308 of the network communication event 204 may be determined, specifically an application layer protocol. Examples of application layer protocols include the network time protocol (NTP), the domain name system (DNS) protocol, the hypertext transport protocol (HTTP), and the file transport protocol (FTP), among other protocols.

Other information can also be collected in the network communication events 204 of the network traffic log 300. Such other information can include the number of bytes of an event 204, the number of packets within an event 204, the number of flows of the event 204, and any TCP flags within the event 204. As additional examples, the outcome of each event 204 may be logged, such as whether the communication was successful in terms of whether the source entity 304 received a reply from the destination entity 306 in response to the initial communication from the source entity 304 to the destination entity 306. If network communication events 204 of multiple network traffic logs 300 are being collected, each such log 300 may be identified within its events 204. Still other information that can be collected in the events 204 include username and other identifying information regarding the source entity 304 and/or destination entity 306, if known.

It is noted that network traffic logs 326 are collected in that information contained within the logs 326 are collected. The original network traffic logs 326 within which the events 204 are originally logged may be read by a software tool and delivered to a datastore such as a database that can then be queried for performing query detection, particularly in the case of offline beacon detection. In the case of online beacon detection, the events 204 may be collected before persistence to such a datastore.

Figure 3B:
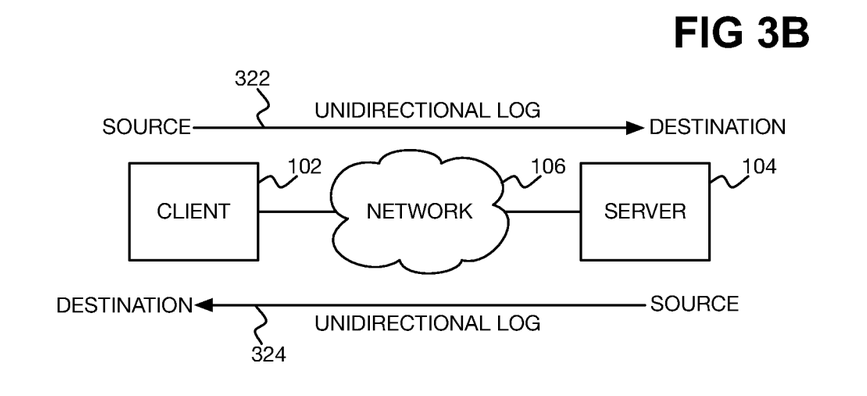

A network traffic log 300 may be a unidirectional log or a bidirectional log. As shown in FIG. 3B, a unidirectional log summarizes network traffic in just one direction. An example of a unidirectional log is a netflow network communication log. Network communication from the client computing device 102 to the server computing device 104 over the network 106 is thus summarized within a unidirectional network traffic log 322, where the client device 102 is considered the source entity and the server device 104 is considered the destination entity. By comparison, network communication from the server device 104 to the client device 102 over the network 106 may be summarized within a different unidirectional network traffic log 324 (or in the same log 322 in another implementation), where the server device 104 is considered the source entity and the client device 102 is considered the source entity.

In summarizing network communication events 204 in the case where the network traffic log 300 is a unidirectional log, it is not known for a given event 204 which of the source and destination entities 304 and 306 is the client computing device 102 at which beaconing was initiated, and which of the entities 304 and 306 is the server computing device 104 to which the beaconing is directed. Therefore, in one implementation, the events 204 may be processed to create a bidirectional summary for two or multiple events. For example, when two or more such unidirectional network communication events 204 regarding the same pair of entities are combined, the source entity 304 of the earliest such event 204 can be deemed as the client computing device 102 at which beaconing was initiated, and the destination entity 306 of this event 204 can be deemed the server computing device 104. Such a bidirectional summary may further be created by aggregating events 204 that occur more than a threshold length of time after the previous event 204 on the same connection.

In another implementation, as part of network communication event collection, a heuristic can be applied to the source and destination network ports 310 and 312 to identify one such network port 310 or 312 to retain within a given event 204 in order to identify the server device 104 as the beacon recipient. The other port 312 or 310 is accordingly discarded. In another implementation, however, both ports 310 and 312 may be retained.

One example heuristic is to simply always select the source network port 310 or the destination network port 312. Still another example heuristic is to select the smaller of the source and destination network ports 310 and 312 to retain. For instance, it may be expected that the network port at which the server computing device 104 receives beacons is a standard port that network communication regarding which will pass through a firewall behind which the client computing device 102 is located. Such standard ports generally have lower port numbers, such as less than 1024. In such instance, the network port at which the client computing device 102 sends network communication is likely to be a non-standard port, which generally has a larger port number. It is not uncommon for such port numbers to be four or five digits in length, for example. Therefore, retaining the smaller of the source and destination ports 310 and 312 is a heuristic by which to identify the server device 104 that is the beaconing recipient.

Another example heuristic is to select the non-ephemeral of the source and destination network ports 310 and 312 to retain. An ephemeral port is a short-lived port number used by the TCP, UDP, and other network transport protocols. Ephemeral ports are usually automatically allocated from a predefined range (e.g., user ports between 1024-49151, and dynamic and/or private ports between 49152 and 65535). For given beaconing from a client computing device 102 to a server computing device 104, the port from which the client device 102 sends network communication is likely to change, potentially on a per-communication basis, whereas the port at which the server device 102 receives network communication is likely to remain constant. Therefore, retaining the non-ephemeral port of the source and destination ports 310 and 312 is a heuristic by which to start searching for beaconing activity, with the server device 104 as the recipient.

Figure 3C:
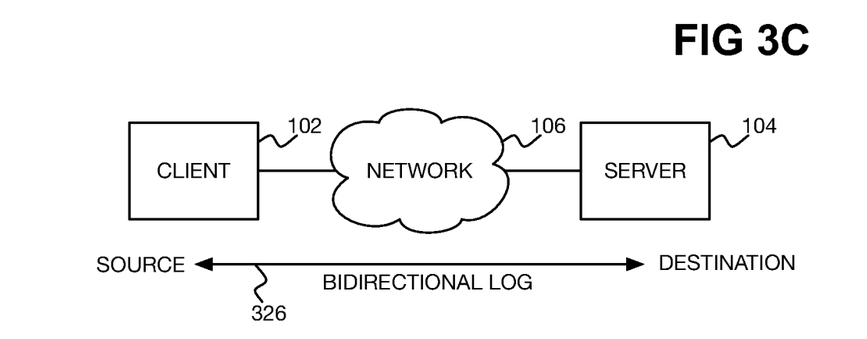

By comparison, as shown in FIG. 3C, a bidirectional log summarizes network traffic in both directions. Examples of bidirectional logs include those provided by intrusion detection systems and firewalls, for instance. Network communication both from the client computing device 102 to the server computing device 104 over the network 106, and from server device 104 to the client device 102, is summarized within the same bidirectional network traffic log 326. In this case, the destination network port 312 of the initial network communication from the client device 102 to the server device 104 (and from which subsequent communication from the server device 104 back to the client device 102 is sent) is known to be associated with the server device 104, and therefore is retained.

Figure 4:
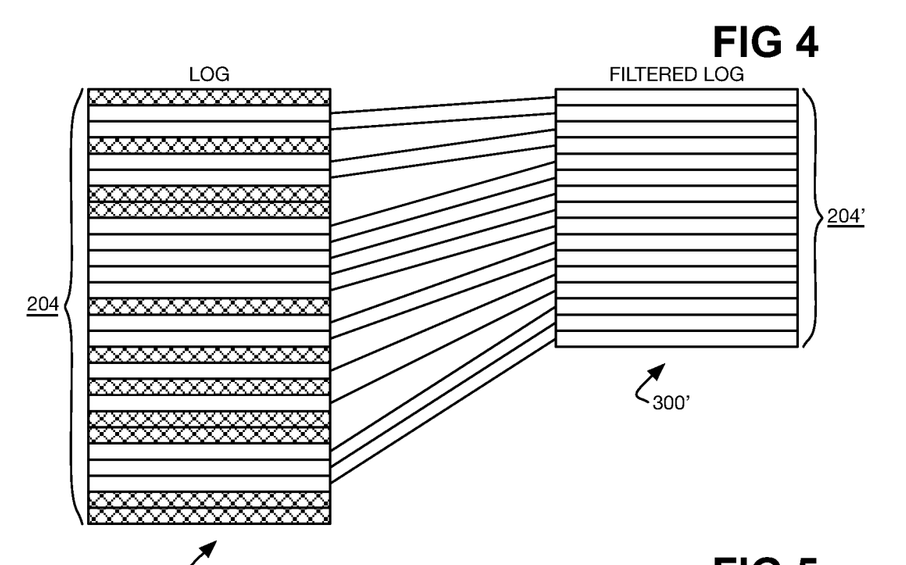
FIG. 4 is a diagram depicting example network communication event filtering.

Referring back to FIG. 2A, once the network communication events 204 have been collected (202), the events 204 can be filtered (206) to yield filtered network communication events 204'. As shown in FIG. 4, filtering the events 204 of the network traffic log 300 results in keeping just some and not all of the events 204, as the filtered events 204' of the filtered network traffic log 300'. In general, the network communication events 204 are filtered to remove those having a predicted unrelatedness to beaconing. That is, the events 204 that are a priori considered as not indicative of beaconing are discarded, and are not part of the filtered events 204'. Such events 204 may have periodicity and occur on a sufficiently regular basis that they otherwise may masquerade as beacons, but in actuality represent legitimate traffic unrelated to beaconing.

For example, a given protocol 308 of a network communication event 204 may be known to not relate to beaconing. A client computing device 102 may periodically send events 204 in the NTP, for instance, to synchronize its internal time clock with a network time server, such as an Internet time server. Because such events 204 are legitimate traffic, they can be removed during filtering. Similarly, the client device 102 may periodically send events 204 in the DNS protocol for legitimate purposes, but which can resemble beaconing, and therefore such events 204 may also be removed during filtering.

In one implementation, if events 204 each specify their number of bytes, events 204 having a legitimate protocol 308 may be removed just if they have a number of bytes within a range indicative of legitimate traffic network. That is, events 204 having a legitimate protocol 308 that have a number of bytes outside of the typical range for traffic according to this protocol 308 may be beacons masquerading as such traffic. Similarly, events 204 that otherwise have a legitimate protocol 308 may be discarded just if they are directed to a known destination entity 306.

Network communication events 204 for which the destination entity 306 is known to not relate to beaconing may similarly be removed during filtering. Such events 204 may occur in a manner that otherwise resembles beaconing. However, if the destination entity 306 is known to be a trusted entity and not be operated by a nefarious party, then such events 204 do not have to be considered further and therefore can be removed. As another example, network traffic between unknown entities 306 and 308 may be examined more often than traffic between known entities 306 and 308. Latter such network traffic may still be examined to identify any new or unexpected beacons, for instance.

Filtering can also be performed on the relatedness or affiliation between the source entity 304 and the destination entity 306. For example, if both entities 304 and 306 of an event 204 are part of the same local network, then such events 204 may be removed or examined less frequently than events 204 for which the source entity 304 is part of the local network and the destination entity 306 is not. As another example, events 204 for which the source entity 304 is outside the local network and the destination entity 306 is inside the local network may be removed or examined less frequently than events 204 for which the source entity 304 is inside the local network and the destination entity 306 is outside the local entity.

Network communication events 204 can also be filtered based on the source network port 310 or the destination network port 312 retained during collection of the events 204, such as has been described in relation to usage of such port 310 or 312 along with the network transport protocol 306 to identify the application layer protocol 308. The network communication events 204 may be filtered in other ways as well. Each event 204 for which the source and destination entities 304 and 306 do not appear in a minimum number of other events 204 may be removed, so that infrequent communication from a given source entity 304 to a given destination entity 306 is not considered. Each event 204 for which the source and destination entities 304 and 306 appear in more than a maximum number of other events 204 may also be removed, so that such events 204 do not by their very number obfuscate detection of beaconing occurring in a smaller number of other events 204. Most generally, filtering can be performed on the basis of any information within the events 204, such as a selected time range, a selected set of entities 304 and/or 306, and so on.

Each network communication event 204 for which the source and destination entities 304 and 306 do not appear in a minimum number of other events 204 during a specified time window may similarly be removed. Likewise, each event 204 for which the source and destination entities 304 and 306 appear in more than a maximum number of other events 204 during a specified time window may be removed. Such event removal in consideration of the time windows in which the events 204 occur is therefore similar to the filtering described in the previous paragraph, but occurs at a more granular level (i.e., per time window).

Network communication events 204 having the same source entity 304 and the same destination entity 306 for which the average or median time period is less than a minimum time period or greater than a maximum time period may be removed. (Note that such filtering may be performed after time differentials 216 are calculated, as described later, in which case the filtering is actually performed afterwards, since the time differentials 216 are the time periods in question.) Such filtering in effect provides for a way by which to consider just events 204 of interest for possible beaconing. Similarly, events 204 having the same source and destination entities 304 and 306 for which the standard deviation in time period is less than a minimum standard of deviation or greater than a maximum standard of deviation may be removed during filtering.

Network communication events 204 having the same source entity 304 and the same destination entity 306 for which a coefficient of variation in time period is greater than a maximum coefficient of variation or less than a minimum coefficient of variation may be removed. The coefficient of variation in this respect is the standard deviation in time period divided by the mean time period. Such filtering also effectively provides for a way by which to consider just events 204 of interest for possible beaconing.

Network communication events 204 having the same source entity 304 and the same destination entity 306 for which a mean of absolute deviations in time period is greater than a maximum mean of absolute deviations or less than a minimum mean of absolute deviations may similarly be removed during filtering. The mean of absolute deviations in this respect is $$\frac{1}{N_{ij}} \sum |per_{i,jk} - \text{mean}(per_{i,j})|,$$

where $N_{ij}$ is the number of events 204 having a given source entity i and a given destination entity j, $per_{ijk}$ is a given event k having the source entity i and the destination entity j, and $\text{mean}(per_{ij})$ is the mean, or average, of all such events $per_{ij}$. Such filtering is another way by which to consider just events 204 of interest for possible beaconing.

Network communication events 204 having the same source entity 304 and the same destination entity 306 for which a coverage or duration in event activity is greater than a maximum coverage or duration or less than a minimum coverage or duration may also be removed during filtering. The coverage of such events 204 in this respect may be the average time period of these events 204, multiplied by their number minus one. The duration of such events 204 may be the largest (i.e., most recent) timestamp 314 of any such event 204, minus the smallest (e.g., earliest) timestamp 314 of any such event 204. Such filtering is an additional way by which to consider just events 204 of interest for possible beaconing.

The network communication events 204 may also be filtered based on their spectral time periods. That is, the spectral time period of each set of events 204 having the same source entity 304 and the same destination entity 306 may be determined in the frequency domain, such as via a fast Fourier transform or a discrete Fourier transform. The spectral time period for events 204 with specific source and destination entities 304 and 306 may also be manually provided. Any events 204 having a given source entity 304 and a given destination entity 306 that have time periods greater than the spectral time period for all the events 204 having these source and destination entities 304 and 306 may then be removed.

Figure 5:
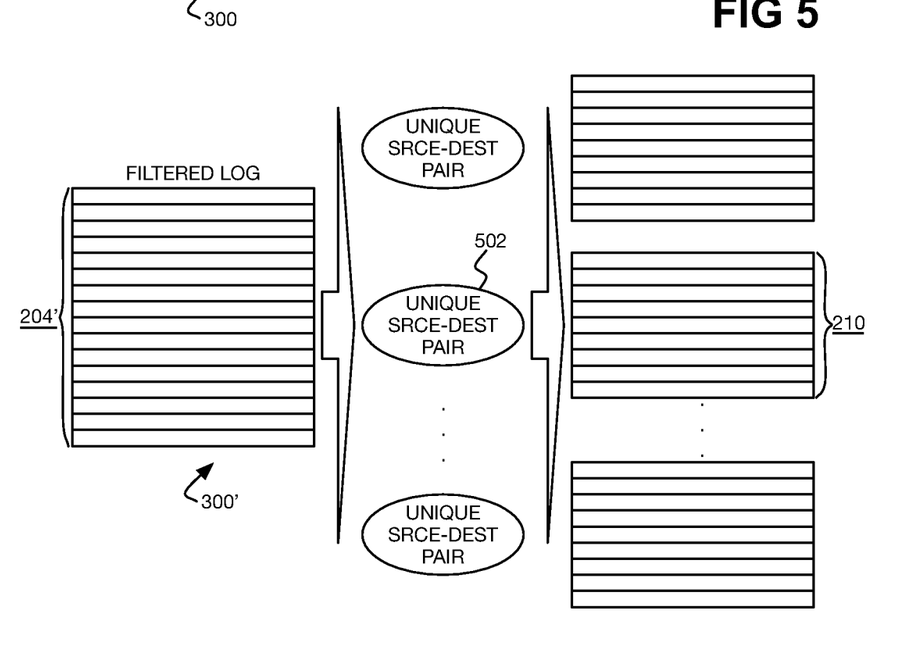
FIG. 5 is a diagram depicting example network communication event aggregation by unique source entity-destination entity pairs.

Referring back to FIG. 2A, once the network communication events 204 have been filtered (206), the resulting filtered network communication events 204' are aggregated (208) by unique source entity-destination entity pairs to yield filtered network communication events 210 for each unique source entity-destination pair. As shown in FIG. 5, aggregating the filtered network communication events 204' of the filtered network traffic log 300' by unique source entity-destination entity pairs 502 results in aggregated groups of filtered network communication events 210 corresponding to the unique pairs 502. There are thus filtered events 210 for each unique source entity-destination entity pair 502. That is, for each pair 502 of a source entity 304 and a destination entity 306 appearing in any filtered event 204', all events 204' having this same pair 502 are aggregated within the same group of events 210.

Referring back to FIG. 2A, if the resulting network communication events 210 are unsatisfactory (212), then further filtering (206) and aggregation (208) may be iteratively performed. That is, the events 210 may be refiltered (206) and reaggregated (208) one or multiple times. Such iterative filtering and aggregation may be particularly useful when beaconing identification occurs in an offline manner. After each filtering and aggregation iteration, the resulting events 210 may be manually inspected, for instance, to determine whether further filtering and aggregation should occur, or if beaconing identification on the basis of the events 210 should continue.

Figure 6:
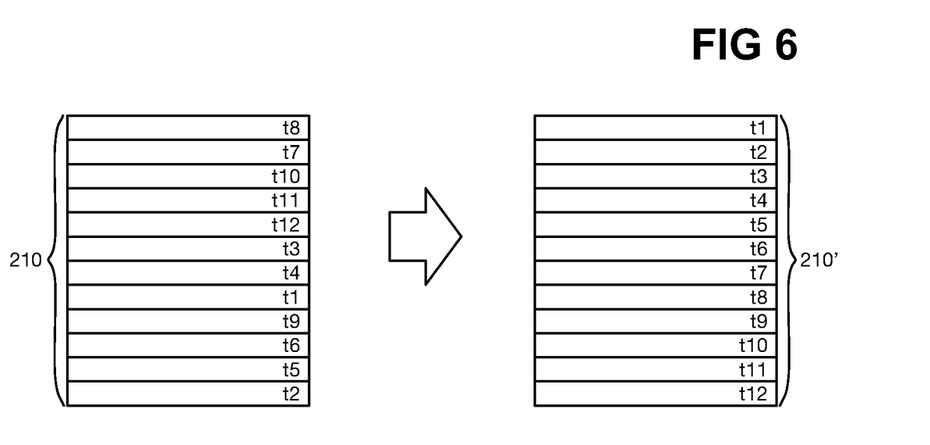
FIG. 6 is a diagram depicting example network communication event timestamp-sorting.

Referring next to FIG. 2B, once the filtered network communication events 210 are considered satisfactory, the events 210 for each unique source entity-destination entity pair 502 are timestamp-sorted (214), yielding timestamp-sorted and filtered network communication events 210' for each unique pair 502. (It is noted that timestamp-sorting may be omitted if the log 300 is already sorted by timestamp, and aggregation is performed in a manner that retains the original order of the log 300.) As shown in FIG. 6, the filtered network communication events 210 for a given source entity-destination entity pair 502 may be out of order with respect to their timestamps t1, t2, . . . , t12, where t1<t2< . . . <12. After being sorted by their timestamps, the resulting network communication events 210' are thus in the order of their timestamps.

Figure 7:
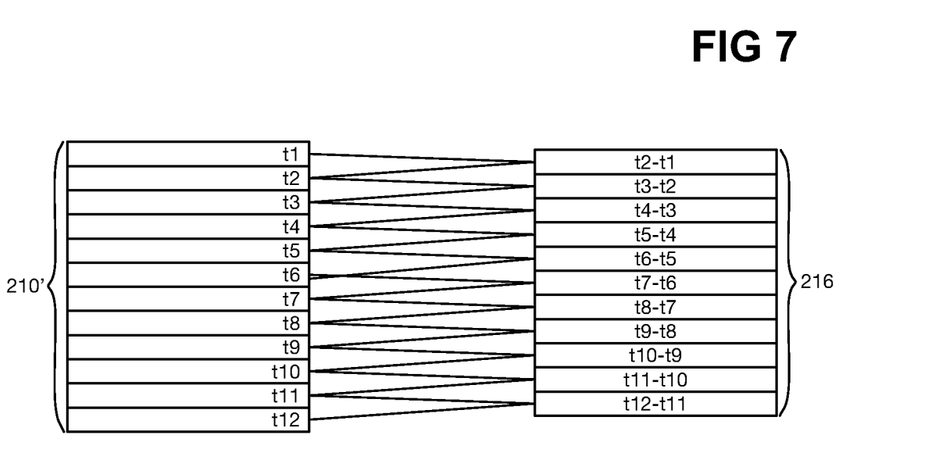
FIG. 7 is a diagram depicting example timestamp differential calculation between adjacent network communication events.

Referring back to FIG. 2B, after timestamp-sorting occurs, time differentials 216 are calculated between adjacent network communication events 210' for each unique source entity-destination entity pair 502 (218). As shown in FIG. 7, time differentials 216 are calculated between the adjacent timestamp-sorted and filtered network communication events 210' for a given source entity-destination entity pair 502. For example, there is a time differential t2−t1 between the adjacent events 210' having the timestamps t1 and t2, a time differential t3−t2 between the adjacent events 210' having the timestamps t2 and t3, and a time differential t12−t11 between the adjacent events 210' having the timestamps t11 and t12. If for a given pair 502 there are N events 210', there are therefore N−1 time differentials 216.

Referring back to FIG. 2B, after time differentials 216 have been calculated between adjacent network communication events 210' for each unique source entity-destination entity pair 502, a beacon likelihood metric 220 is calculated for each pair 502 (222). The beacon likelihood metric 220 for a source entity-destination entity pair 502 is a score calculated from the time differentials 216 for that pair 502 corresponding to the likelihood that the logged communication between the source entity 304 and the destination entity 306 of the pair 502 is indicative of beaconing. For example, the lower the beacon likelihood metric 220 for a pair 502, the greater the likelihood that the logged communication between the source and destination entities 304 and 306 of the pair is beaconing activity.

In one implementation, the beacon likelihood metric 220 for a source entity-destination entity pair 502 may be calculated as a modified normalized mean of absolute deviations of the calculated time differentials 216 for that pair 502. Specifically, the modified normalized mean of absolute deviations may be calculated by dividing the sum of the absolute difference between each calculated time differential 216 and the median of the calculated time differentials 216 by a product of the number of the timestamp-sorted and filtered network communication events 210' for the pair 502 and the median of the calculated time differentials 216. Mathematically, this beacon likelihood metric 220 can be expressed as $$\frac{\sum |\mathit{diff}_{ijk} - \mathrm{median}(\mathit{diff}_{ij})|}{N_{ij} \times \mathrm{median}(\mathit{diff}_{ij})}.$$

In this expression, $N_{ij}$ is the number of events 210' having a given source entity i and a given destination entity j, $\mathit{diff}_{ijk}$ is a given time differential k between adjacent events 210' having the source entity i and the destination entity j, and $\mathrm{median}(\mathit{diff}_{ij})$ is the median of all such time differentials $\mathit{diff}_{ij}$.

This particular beacon likelihood metric 220 is normalized in that it is divided by the number of events 210' having a given source entity i and a given destination entity j, $N_{ij}$. The metric 220 is a mean of absolute deviations in that the sum of the absolute deviations, $\Sigma|\mathit{diff}_{ijk}-\mathrm{median}(\mathit{diff}_{ij})|$, is averaged as a result of division by the median, $\mathrm{median}(\mathit{diff}_{ij})$. The metric 220 can be considered robust in that it uses median instead of mean in this respect (since median is more robust than mean because it changes less if outliers are present), and further does not use squares of differences as is the case with standard deviation.

Based on the calculated beacon likelihood metrics 220 for the unique source entity-destination entity pairs 502, those unique source-destination entity pairs 224 that are indicative of beaconing are identified (226). That is, each unique pair 224 of a source entity 304 and a destination entity 306 is one of the unique pairs 502. For example, a specified number of the unique pairs 502 having the lowest beacon likelihood metrics 220 may be identified as the unique pairs 224 that are indicative of beaconing. As another example, each unique pair 502 having a beacon likelihood metric 220 lower than a threshold may be identified as a unique pair 224 that is indicative of beaconing. A pair 224 is indicative of beaconing in that the logged communication between the source entity 304 and the destination entity 306 of the pair 224 is indicative of beaconing. That is, the communication between the source entity 304 and the destination entity 306 of each such pair 224 is likely to be or reflect beaconing activity.

An action may then be performed (228) in relation to the identified unique source entity-destination entity pairs 224 that are indicative of beaconing. For example, the identified pairs 224 may be displayed to a user, who can assess what further action should be taken. As another example, a remedial action may be performed to protect the network 106 from potential security compromise that may result from or otherwise related to such indicated beaconing. For example, the network 106 may be reconfigured to prevent network traffic to the destination entity 306 of each identified pair 224. As another example, the source entities 304 of the identified pairs 224 may be removed from the network 106 and inspected to identify the malware or other issue resulting in their beaconing to respective destination entities 306.

In one implementation, the process 200 that has been described can be iteratively performed in relation to aggregated groups of events 204. For example, events 204 between the same unique source entity-destination entity pairs 224 may be aggregated in windows of a specified time period, and the time intervals between such aggregated groups of events 204 considered. Such an implementation is suitable for situations in which a source entity 304 and a destination entity 306 communicate in bursts of connections, where the connections themselves are periodic.

Figure 8:
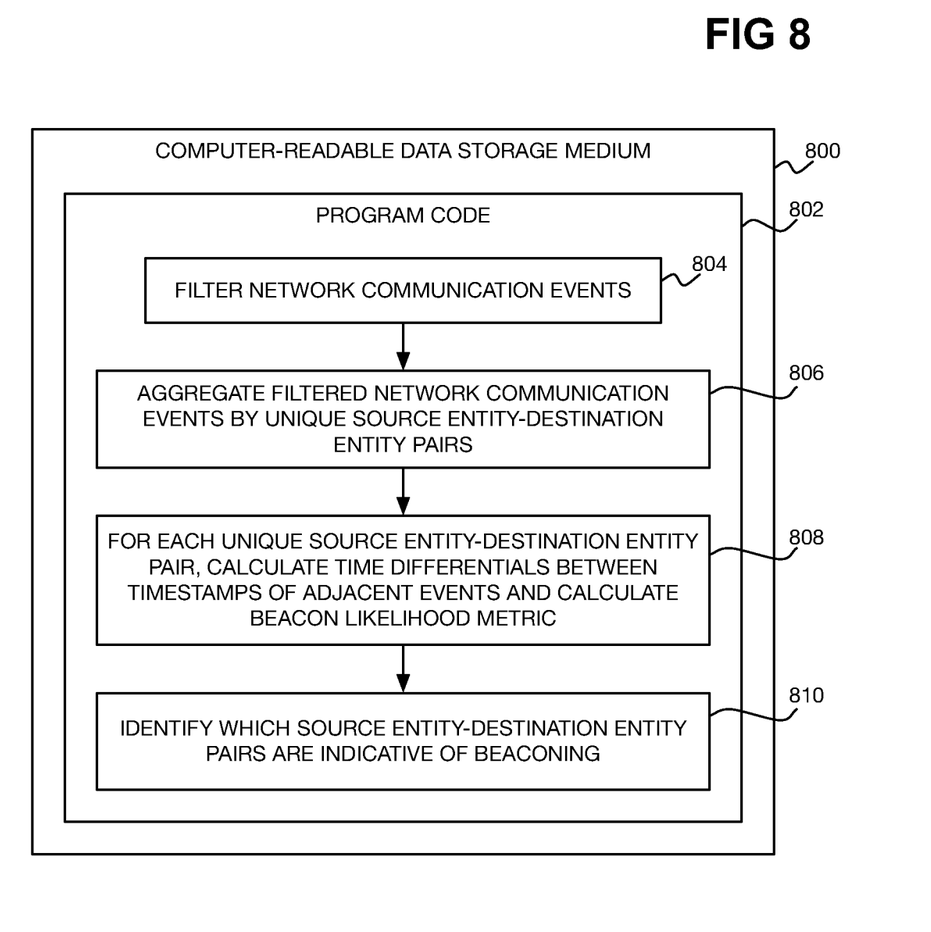
FIG. 8 is a diagram of an example non-transitory computer-readable data storage medium.

FIG. 8 shows an example non-transitory computer-readable data storage medium 800 storing program code 802 executable by a processor of a computing device to perform processing. The processing includes filtering network communication events of a network traffic log to remove the network communication events having a predicted unrelatedness to beaconing (804). Each network communication event has a timestamp, a source entity, and a destination entity.

The processing includes aggregating the filtered network communication events by unique source entity-destination entity pairs (806). The processing includes, for each unique source entity-destination entity pair, timestamp-sorting the filtered network communication events, calculating time differentials between the timestamps of adjacent timestamp-sorted and filtered network communication events, and calculating a beacon likelihood metric from the calculated time differentials (808). The processing includes identifying which of the unique source entity-destination entity pairs are indicative of beaconing based on the beacon likelihood metric calculated for each unique source entity-destination entity pair (810).

Figure 9:
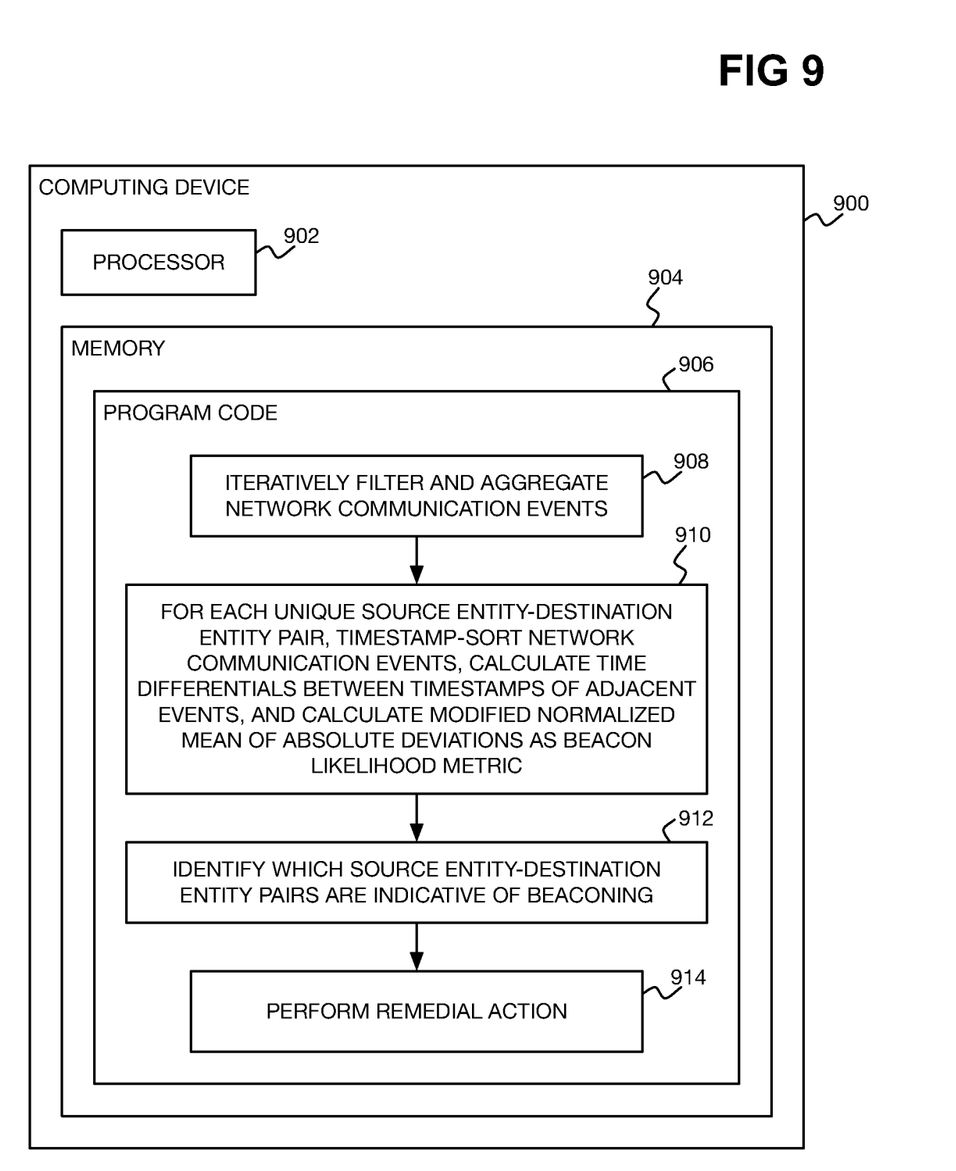
FIG. 9 is a diagram of an example computing device.

FIG. 9 shows an example computing device 900. The computing device 900 includes a processor 902 and a memory 904 storing instructions 906 (i.e., program code) executable by the processor 902 to perform processing. The processing includes iteratively filtering and aggregating network communication events of a network traffic log (908). The network communication events are filtered to remove the network communication events having a predicted unrelatedness to beaconing. The network communication events aggregated by unique source entity-destination entity pairs, each network communication event having a timestamp, a source entity, and a destination entity (910).

The processing includes, for each unique source entity-destination entity pair, timestamp-sorting the filtered network communication events, calculating time differentials between the timestamps of adjacent timestamp-sorted and filtered network communication events, and calculating a modified normalized mean of absolute deviations of the calculated time differentials as a beacon likelihood metric (910). The processing includes identify which of the unique source entity-destination entity pairs are indicative of beaconing based on the beacon likelihood metric calculated for each unique source entity-destination entity pair (912). The processing includes performing a remedial action in relation to the unique source entity-destination entity pairs that have been identified as indicative of beaconing (914).

As has been noted, beaconing identification can occur offline or online. As an offline process, network traffic logs of network communication events can be collected, filtered, and aggregated for beaconing identification well after the events have occurred, where such offline processing may not occur directly on the logs, as noted above. Such an offline process is well suited for interactivity, in which a user can manually participate in the iterative filtering and aggregation of the network communication events. By comparison, online beaconing identification is suitable for situations in which more immediate, and automated, beaconing identification is desired. The beaconing identification process 200 of FIGS. 2A and 2B that has been described can be employed in either an offline or online manner, but other extensions to the process can be made for better adaptation to online beaconing identification.

Figure 10:
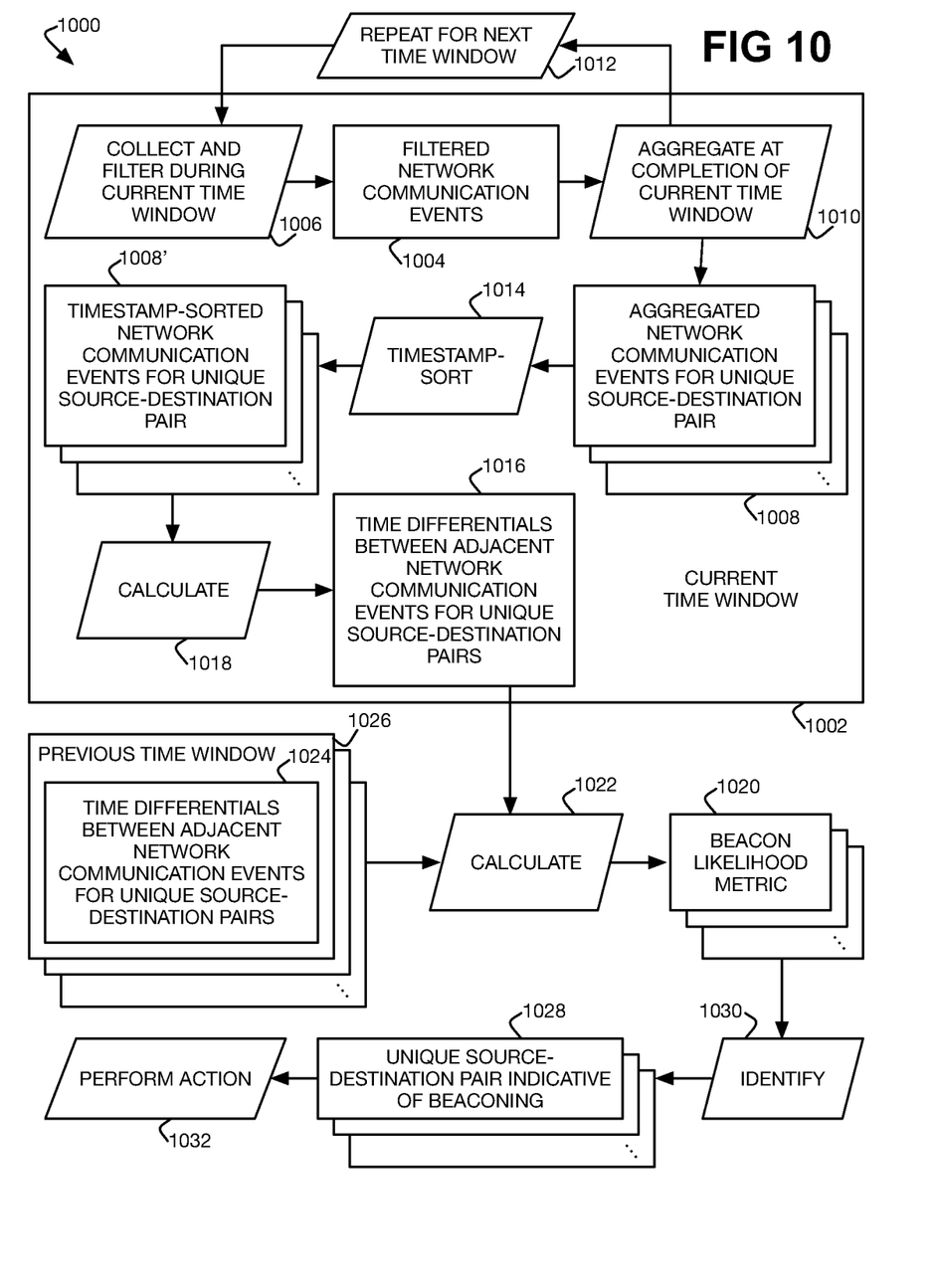
FIG. 10 is a diagram of an example process for identifying beaconing in an online manner.

FIG. 10 shows an example process 1000 for identifying beaconing in an online manner. The process 1000 may be implemented as program code stored on a non-transitory computer-readable data storage medium and executable by a processor of a computing device. The process 1000 occurs on a time window basis, where each time window is a specified length of time measurable in minutes, hours, or even days. Certain parts of the process 1000 can occur while a current time window 1002 is occurring, whereas other parts can occur upon completion of the current time window 1002 (with the former parts concurrently occurring for the next time window).

During the current time window 1002, therefore, network communication events 1004 are collected and filtered (1006). At the completion of the current time window 1002, the filtered network communication events 1004 are aggregated (1010) by unique source entity-destination entity pairs to yield network communication events 1008 for each unique source entity-destination entity pair that occurred during the current time window 1002. At this time, a new time window begins, and therefore the process 1000 is concurrently repeated (1012) for this next time window with the collection and filtering of network communication events 1004 during this time window (1006).

The network communication events 1008 for each unique source entity-destination entity pair that occurred during the current time window 1002 are timestamp-sorted (1014) to yield timestamp-sorted network communication events 1008' for each unique pair. It is noted that timestamp-sorting can also be performed as part of aggregation, and not separately, to reduce processing overhead. For each unique source entity-destination entity pair, time differentials 1016 between adjacent network communication events that occurred during the current time window 1002 are then calculated (1018). The time differentials 1016 are thus calculated on a per-time window basis, upon completion of the current time window 1002, for each unique pair.

A beacon likelihood metric 1020 for each unique source entity-destination entity pair, by comparison, is calculated (1022) from the time differentials 1016 for the current time window 1002 as well as from the time differentials 1024 for a specified number of previous time windows 1026. For example, the beacon likelihood metrics 1020 may be calculated for the unique pairs from the time differentials 1016 for the current time window 1002 and the time differentials 1024 for a specified number of the immediately preceding time windows 1026. Therefore, whereas the time differentials 1016 and 1024 are calculated on a per-time window basis, the beacon likelihood metrics 1020 are calculated across time windows, including the current time window 1002 that just completed and a specified number of previous time windows 1026.

The unique source entity-destination entity pairs 1028 indicative of beaconing can then be identified (1030) on the basis of the beacon likelihood metrics 1020 that have been calculated, with a remedial or other action performed (1032) in relation to the identified unique pairs that are indicative of beaconing. In the process 1000, the unique source entity-destination entity pairs 1028 are thus identified each time the current time window 1002 has completed. Such identification is therefore effectively updated as additional network communication events 1004 are collected and filtered, because the identification relies on the time differentials 1016 and 1024 calculated for the current time window 1002 that has just completed and for a specified number of preceding time windows 1026.

Figure 11:
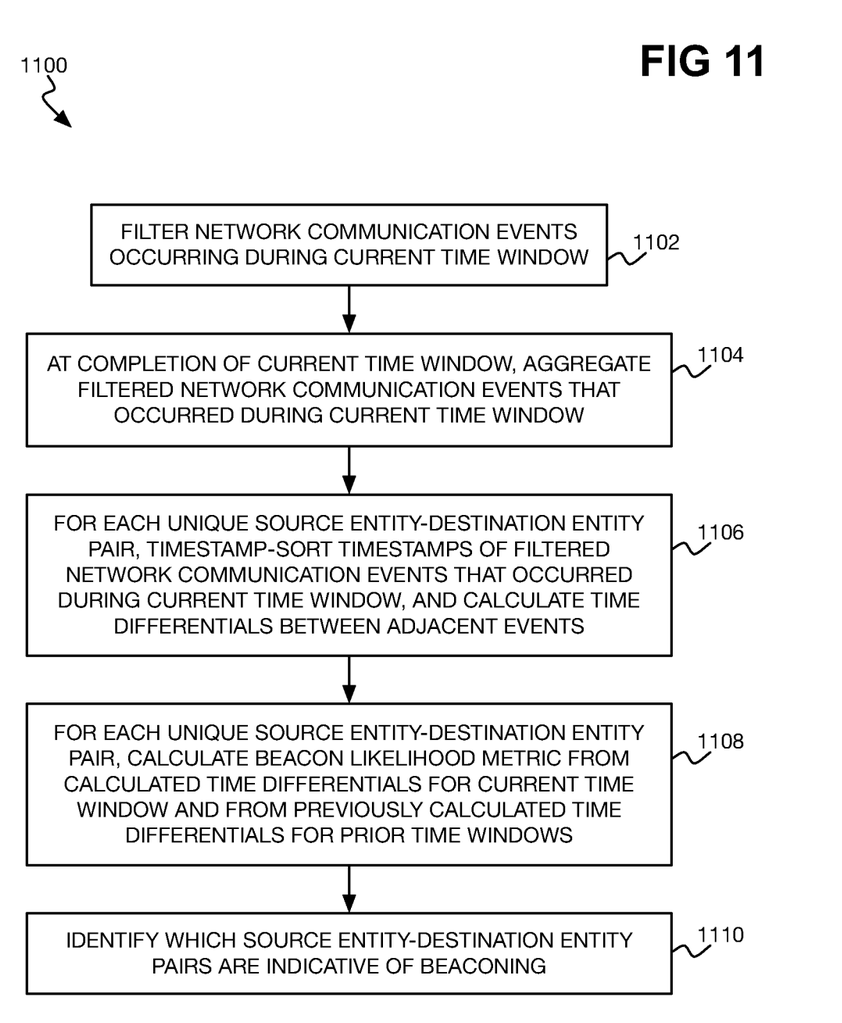
FIG. 11 is a flowchart of an example method.

FIG. 11 shows an example method 1100. The method 1100 may be implemented as program code stored on a non-transitory computer-readable data storage medium and executable by a processor of a computing device. The method 1100 includes filtering network communication events occurring during a current time window to remove the network communication events having a predicted unrelatedness to beaconing (1102). Each network communication event has a timestamp, a source entity, and a destination entity. The method 1100 includes, at completion of the current time window, aggregating the filtered network communication events that occurred during the current time window by unique source entity-destination entity pairs (1104).

The method 1100 includes, for each unique source entity-destination entity pair, timestamp-sorting the filtered network communication events that occurred during the current time window, and calculating time differentials between the timestamps of adjacent timestamp-sorted and filtered network communication events that occurred during the current time window (1106). The method 1100 includes, for each unique source entity-destination entity pair, calculating a beacon likelihood metric from the calculated time differentials for the current time window and from previously calculated time differentials for a number of prior time windows (1108). The method 1100 includes identifying which of the unique source entity-destination pairs are indicative of beaconing based on the beacon likelihood metric calculated for each unique source entity-destination entity pair (1110).

Techniques have been described for identifying beaconing that is indicative of potential security compromises. The techniques provide for iterative filtering and aggregation of network communication events so that the events of interest are considered for potential beaconing activity. The techniques employ a beacon likelihood metric, such as a modified normalized mean of absolute deviations, calculated from time differentials between adjacent events for each unique source entity-destination entity pair. The described techniques have been shown to accurately identify beaconing, permitting potential security compromises to be addressed.

We claim:

1. A non-transitory computer-readable data storage medium storing program code executable by a processor to perform processing comprising:
    filtering network communication events of a network traffic log to remove from the network traffic log the network communication events having a predicted unrelatedness to beaconing, each network communication event having a timestamp, a source entity, and a destination entity;
    aggregating the filtered network communication events by unique source entity-destination entity pairs;
    for each unique source entity-destination entity pair, timestamp-sorting the filtered network communication events, calculating time differentials between the timestamps of adjacent timestamp-sorted and filtered network communication events, and applying a function on all the calculated time differentials to generate a beacon likelihood metric as an output of the function; and identifying which of the unique source entity-destination entity pairs are indicative of beaconing based on the beacon likelihood metric generated for each unique source entity-destination entity pair.

2. The non-transitory computer-readable data storage medium of claim 1, wherein the processing further comprises:

performing a remedial action in relation to the unique source entity-destination entity pairs that have been identified as indicative of beaconing to protect a network from potential security compromise related to beaconing.

3. The non-transitory computer-readable data storage medium of claim 2, wherein performing the remedial action comprises:

for each unique source entity-destination entity pair that has been identified as indicative of beaconing, reconfiguring the network to prevent traffic to the destination entity of the unique source entity-destination entity pair.

4. The non-transitory computer-readable data storage medium of claim 1, wherein the processing further comprises:

collecting the network communication events of the network traffic log, each network communication event further having a protocol of the network communication event.

5. The non-transitory computer-readable data storage medium of claim 4, wherein the network traffic log comprises a unidirectional network traffic log in which just source entity-to-destination entity network communication events are logged, and collecting the network communication events comprises:

for each network communication event, applying a heuristic to a source network port and a destination network port of the network communication event to identify which network port to retain in the network communication event, wherein the network communication events are further filtered and/or aggregated based on the source network port or the destination network port retained in each network communication event.

6. The non-transitory computer-readable data storage medium of claim 5, wherein applying the heuristic comprises:

selecting a smaller of the source network port and the destination network port to retain in the network communication event; or selecting which of the source network port and the destination network port that is non-ephemeral to retain in the network communication event.

7. The non-transitory computer-readable data storage medium of claim 4, wherein the network traffic log comprises a bidirectional network traffic log in which both source entity-to-destination entity and destination entity-to-source entity events are logged, and collecting the network communication event comprises:

for each network communication event, selecting a destination network port and not a source network port of the network communication event to retain in the network communication event, wherein the network communication events are further filtered and/or aggregated based on the destination network port retained in each network communication event.

8. The non-transitory computer-readable data storage medium of claim 4, wherein filtering the network communication events comprises one or multiple of:

removing, from the network traffic log, each network communication event for which the protocol is known to not relate to beaconing; and removing, from the network traffic log, the network communication event for which the destination entity is known to not relate to beaconing.

9. The non-transitory computer-readable data storage medium of claim 1, wherein filtering the network communication events comprises one or multiple of:

removing, from the network traffic log, each network communication event for which the source entity and destination entity do not appear in a minimum number of other network communication events;

removing, from the network traffic log, each network communication event for which the source entity and destination entity appear in more than a maximum number of other network communication events;

removing, from the network traffic log, each network communication event for which the source entity and destination entity do not appear in the minimum number of the other network communication events during a specified time window; and removing, from the network traffic log, each network communication event for which the source entity and destination entity appear in more than the maximum number of other network communication events during the specified time window.

10. The non-transitory computer-readable data storage medium of claim 1, wherein filtering the network communication events comprises one or multiple of:

removing, from the network traffic log, the network communication events having a same source entity and a same destination entity for which an average or median time period is less than a minimum time period or greater than a maximum time period; and removing, from the network traffic log, the network communication events having the same source entity and the same destination entity for which a standard deviation in time period is greater than a maximum standard deviation or less than a minimum standard deviation.

11. The non-transitory computer-readable data storage medium of claim 1, wherein filtering the network communication events comprises one or multiple of:

removing, from the network traffic log, the network communication events having a same source entity and a same destination entity for which a coefficient of variation in time period is greater than a maximum coefficient of variation or less than a minimum coefficient of variation;

removing, from the network traffic log, the network communication events having the same source entity and the same destination entity for which a mean of absolute deviations in time period is greater than a maximum mean of absolute deviations or less than a minimum mean of absolute deviations; and removing, from the network traffic log, the network communication events having the same source entity and the same destination entity for which a coverage or duration in event activity is greater than a maximum coverage or duration or less than a minimum coverage or duration.

12. The non-transitory computer-readable data storage medium of claim 1, filtering the network communication events comprises:
for the network communication events having a same source entity and a same destination entity, determining a spectral time period in a frequency domain,
wherein the network communication events of the network traffic log are further filtered and/or aggregated based on the spectral time period of network communication events having the same source entity and the same destination entity.

13. The non-transitory computer-readable data storage medium of claim 1, wherein the processing further comprises:
after aggregating the filtered network communication events, refiltering the network communication events of the network traffic log and reaggregating the refiltered network communication events before generating the beacon likelihood metric for each unique source entity-destination entity pair.

14. The non-transitory computer-readable data storage medium of claim 1, wherein filtering the network communication events and aggregating the filtered network communication events comprises iteratively filtering and aggregating the network communication events.

15. The non-transitory computer-readable data storage medium of claim 1, wherein applying the function on all the calculated time differentials to generate the beacon likelihood metric as the output of the function comprises:
calculating a modified normalized mean of absolute deviations of all the calculated time differentials as the beacon likelihood metric.

16. The non-transitory computer-readable data storage medium of claim 15, wherein calculating the modified normalized mean of absolute deviations comprises:
dividing a sum of an absolute difference between every calculated time differential and a median of the calculated time differentials by a product of a number of the timestamp-sorted and filtered network communication events and the median of the calculated time differentials.

17. A method comprising:
filtering, by a processor, network communication events occurring during a current time window to remove from a network traffic log the network communication events having a predicted unrelatedness to beaconing, each network communication event having a timestamp, a source entity, and a destination entity;
at completion of the current time window, aggregating, by the processor, the filtered network communication events that occurred during the current time window by unique source entity-destination entity pairs;
for each unique source entity-destination entity pair, timestamp-sorting, by the processor, the filtered network communication events that occurred during the current time window, and calculating time differentials between the timestamps of adjacent timestamp-sorted and filtered network communication events that occurred during the current time window;
for each unique source entity-destination entity pair, applying, by the processor, a function on all the calculated time differentials for the current time window and all previously calculated time differentials for a number of prior time windows to generate a beacon likelihood metric as an output of the function; and
identifying, by the processor, which of the unique source entity-destination pairs are indicative of beaconing based on the beacon likelihood metric calculated for each unique source entity-destination entity pair.

18. The method of claim 17, further comprising:
performing, by the processor, a remedial action in relation to the unique source entity-destination entity pairs that have been identified as indicative of beaconing to protect a network from potential security compromise related to beaconing.

19. The method of claim 17, wherein the method is repeated for a new current time window upon completion of the current time window.

20. A computing device comprising:
a processor;
a memory storing program code executable by the processor to:
iteratively filter and aggregate network communication events of a network traffic log, the network communication events filtered to remove from the network traffic log the network communication events having a predicted unrelatedness to beaconing, the network communication events aggregated by unique source entity-destination entity pairs, each network communication event having a timestamp, a source entity, and a destination entity;
for each unique source entity-destination entity pair, timestamp-sort the filtered network communication events, calculate time differentials between the timestamps of adjacent timestamp-sorted and filtered network communication events, and calculate a modified normalized mean of absolute deviations of all the calculated time differentials as a beacon likelihood metric;
identify which of the unique source entity-destination entity pairs are indicative of beaconing based on the beacon likelihood metric calculated for each unique source entity-destination entity pair; and
perform a remedial action in relation to the unique source entity-destination entity pairs that have been identified as indicative of beaconing.

* * * * *